US012679324B2

(12) United States Patent
Endo

(10) Patent No.: US 12,679,324 B2
(45) Date of Patent: Jul. 14, 2026

(54) CONTROL DEVICE FOR HYBRID ELECTRIC VEHICLE THAT CONTROLS BASED ON A WIDE-OPEN-THROTTLE OPERATION LINE

(71) Applicant: TOYOTA JIDOSHA KABUSHIKI KAISHA, Toyota (JP)

(72) Inventor: Hiroki Endo, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 30 days.

(21) Appl. No.: 18/732,833

(22) Filed: Jun. 4, 2024

(65) Prior Publication Data

US 2025/0145143 A1     May 8, 2025

(30) Foreign Application Priority Data

Nov. 2, 2023    (JP) ................................. 2023-188133

(51) Int. Cl.
*B60W 20/10*        (2016.01)
*B60W 10/06*        (2006.01)
*B60W 10/08*        (2006.01)

(52) U.S. Cl.
CPC ............ *B60W 20/10* (2013.01); *B60W 10/06* (2013.01); *B60W 10/08* (2013.01)

(58) Field of Classification Search
CPC ...... B60W 20/10; B60W 10/06; B60W 10/08; B60W 2510/0657; B60W 2510/244; B60W 2540/10; B60W 2710/0666; B60W 2710/083; B60W 20/16; Y02T 10/62
See application file for complete search history.

(56) References Cited

U.S. PATENT DOCUMENTS

| | | | |
|---|---|---|---|
| 2013/0030633 A1* | 1/2013 | Yamamoto | ............ B60W 20/13 |
| | | | 180/65.23 |
| 2013/0166125 A1* | 6/2013 | Yamamoto | .......... B60L 15/2045 |
| | | | 180/65.265 |
| 2016/0001767 A1* | 1/2016 | Hisano | ................... B60K 6/445 |
| | | | 903/903 |
| 2019/0351892 A1 | 11/2019 | Tsuda | |
| 2021/0146912 A1 | 5/2021 | Choi et al. | |

FOREIGN PATENT DOCUMENTS

| | | |
|---|---|---|
| JP | 2016-016689 A | 2/2016 |
| JP | 2019-199194 A | 11/2019 |
| JP | 2020-075534 A | 5/2020 |

* cited by examiner

*Primary Examiner* — Brian P Sweeney
(74) *Attorney, Agent, or Firm* — SoraIP, Inc.

(57)        ABSTRACT

An engine is controlled based on a wide-open-throttle operation line connecting a driving point at which the engine outputs the maximum torque in a state where the throttle valve opening degree is maximum, and a non-wide-open-throttle operation line connecting a driving point at which the exhaust state of the engine is improved as compared with the wide-open-throttle operation line. A CD mode or a CS mode is selected to drive hybrid electric vehicle. When CD mode is selected, the use of the wide-open-throttle operation line is prohibited, and a requested driving force corresponding to the state where the throttle valve opening degree is maximum is set based on a compounded torque obtained by summing an engine torque determined based on the non-wide-open-throttle operation line and a motor torque that can be output in accordance with the allowable discharge electric power of the battery, and the driving force is controlled.

5 Claims, 4 Drawing Sheets

CONTROL DEVICE FOR HYBRID ELECTRIC VEHICLE THAT CONTROLS BASED ON A WIDE-OPEN-THROTTLE OPERATION LINE

CROSS-REFERENCE TO RELATED APPLICATION

This application claims priority to Japanese Patent Application No. 2023-188133 filed on Nov. 2, 2023, incorporated herein by reference in its entirety.

BACKGROUND

1. Technical Field

The disclosure relates to a control device for a hybrid electric vehicle equipped with an engine (internal combustion engine) and a motor, as driving force sources.

2. Description of Related Art

Japanese Unexamined Patent Application Publication No. 2020-75534 (JP 2020-75534 A) describes a control device for a hybrid electric vehicle, the control device selecting one control mode out of a plurality of control modes including a charge sustaining (CS) mode for suppressing decrease in amount of charge of a battery, and a charge depleting (CD) mode for consuming electric power of the battery, thereby performing travelling control of the vehicle. In the control device for the hybrid electric vehicle described in JP 2020-75534 A, when engine revolutions are in a range of a preset value or lower, an operation line of an engine is switched in accordance with the control mode that is currently selected, such that the operation line of the engine when the CD mode is selected is situated on a lower engine torque side from the operation line of the engine when the CS mode is selected.

Also, Japanese Unexamined Patent Application Publication No. 2016-16689 (JP 2016-16689 A) describes, with respect to a hybrid electric vehicle that travels by selecting one of the CD mode or the CS mode, a control device for the hybrid electric vehicle of which an object is to improve fuel efficiency in the CD mode. The control device of the hybrid electric vehicle described in this JP 2016-16689 A selects one of the CD mode that consumes a state of charge (SOC) of the battery and the CS mode that maintains the SOC of the battery at a predetermined level, for the vehicle to travel. When the CD mode is selected, control is performed such that the greatest driving force of the vehicle is smaller than that when the CS mode is selected. The greatest value of the vehicle driving force when the CD mode is selected is set such that torque of an electric motor does not exceed a limit torque that is set based on efficiency of the electric motor.

Now, Japanese Unexamined Patent Application Publication No. 2019-199194 (JP 2019-199194 A) describes a control device for a hybrid electric vehicle, of which an object is to obtain a great driving force even when there is a limitation on motor output. In the control device for the hybrid electric vehicle described in JP 2019-199194, the hybrid electric vehicle is caused to travel while charging a battery when requested driving force for the hybrid electric vehicle is greater than an outputtable driving force when output of a motor generator is greatest and also the battery is not charged (greatest driving force without charging the battery). JP 2019-199194 A also describes a control example for calculating a target engine torque, based on the requested driving force, the greatest driving force without charging the battery, greatest driving force while charging the battery (a driving force that is outputtable when the battery is being charged), and a wide-open-throttle (WOT) operation line.

SUMMARY

A hybrid electric vehicle (HEV) equipped with an engine and a motor (motor generator) as a driving force source drives the motor with electric power supplied from a battery. HEVs are capable of generating a driving force and traveling under output of the motor (motor traveling or EV traveling), and of causing the motor to function as a generator to charge the battery. In particular, a so-called plug-in hybrid electric vehicle (PHEV) that is capable of charging a battery from an external power source is equipped with a battery having a larger capacity than a normal HEV. PHEVs basically perform EV travelling until the SOC of the battery falls below a predetermined level. The CD mode and the CS mode such as described in JP 2020-75534 A and JP 2016-16689 A above are usually set with regard to such PHEVs. In PHEVs, either the CD mode or the CS mode is selected in accordance with the SOC of the battery.

On the other hand, an engine that is installed as a driving force source for an HEV or a PHEV is controlled based on, for example, a wide-open-throttle operation line (WOT operation line) and a fuel efficiency priority operation line, which are set as shown in FIG. 1. The wide-open-throttle operation line or the fuel efficiency priority operation line is selected in accordance with magnitude of the requested driving force, and the engine torque and engine revolutions are controlled based on the operation line that is selected. Accordingly, when the CD mode is set in a PHEV such as described above, and a great driving force is requested in a wide-opened accelerator state in which an accelerator pedal is maximally depressed, for example, output of the engine is added to output of the motor in the CD mode, to generate a great driving force corresponding to the requested driving force. In such a case, in the conventional control, power is prioritized over fuel efficiency of the engine, and accordingly the wide-open-throttle operation line is selected and the engine is controlled to the greatest output state. When the engine is controlled based on the wide-open-throttle operation line, the fuel efficiency and exhaust emission (nature and discharge amount of exhaust gas) of the engine deteriorates as compared with when the engine is controlled based on the fuel efficiency priority operation line. When the fuel efficiency priority operation line is selected for a great drive request such as when the accelerator is wide open, the driving force that is obtained is insufficient, and power performance of the hybrid electric vehicle deteriorates.

This disclosure has been conceived by focusing on the technical problem described above, and improves fuel efficiency of the engine without causing decrease in power performance. Furthermore, an object of this disclosure is to provide a control device for a hybrid electric vehicle, which is capable of suppressing deterioration in exhaust emission.

To achieve the above object, this disclosure is
a control device for a hybrid electric vehicle including an engine and a motor that are installed as driving force sources that output driving torque for generating driving force, and a battery for exchanging electric power with the motor, in which traveling is performable by selectively setting at least a first control mode for driving the motor by supplying electric power from the battery, and a second control mode for not supplying electric power to the motor from the battery, and in which driving force is controlled based on a requested driving force that is set in accordance with a vehicle speed and a throttle valve opening degree, the control device including a controller for controlling the hybrid electric vehicle.

The controller controls the engine based on at least a wide-open-throttle operation line connecting driving points at which the engine outputs greatest torque in a state in which the throttle valve opening degree is greatest, and a non-wide-open-throttle operation line connecting driving points at which an exhaust state of the engine improves in comparison with the wide-open-throttle operation line, selects one of the first control mode and the second control mode to cause the hybrid electric vehicle to travel in, and further, when the first control mode is selected, forbids use of the wide-open-throttle operation line (i.e., forbids operation of the engine based on the wide-open-throttle operation line), and also sets the requested driving force in accordance with the state in which the throttle valve opening degree is greatest, based on a compounded torque obtained by summing output torque of the engine that is determined based on the non-wide-open-throttle operation line and output torque of the motor that is outputtable in accordance with allowable discharge electric power of the battery at that point in time, such that the driving force is controlled.

Also, the controller according to this disclosure may be configured to determine, when the first control mode is selected, a predetermined condition under which there is a possibility of the exhaust state deteriorating, and when determination is made that there is a possibility of the exhaust state deteriorating, forbid use of the wide-open-throttle operation line, and also set the requested driving force in accordance with the state in which the throttle valve opening degree is greatest, based on the compounded torque, such that the driving force is controlled.

Also, the non-wide-open-throttle operation line according to this disclosure may include a fuel efficiency priority operation line connecting driving points at which the exhaust state is improved as compared with the wide-open-throttle operation line and also fuel efficiency of the engine is improved, or the fuel efficiency of the engine becomes optimal, and the compounded torque according to this disclosure may include a fuel efficiency priority torque obtained by summing the output torque of the engine determined based on the fuel efficiency priority operation line and the output torque of the motor that is outputtable in accordance with allowable discharge electric power of the battery.

Also, the non-wide-open-throttle operation line according to this disclosure may include an intermediate operation line connecting driving points at which the exhaust state is improved as compared with the wide-open-throttle operation line, the fuel efficiency is improved, and also the output torque of the engine is increased as compared with the fuel efficiency priority operation line, the compounded torque according to this disclosure may include an intermediate torque obtained by summing the output torque of the engine determined based on the intermediate operation line and the output torque of the motor that is outputtable in accordance with allowable discharge electric power of the battery, and the controller according to this disclosure may be configured to, when the first control mode is selected, or when determination is made that there is a possibility of the exhaust state deteriorating, forbid use of the wideopen-throttle operation line, and also set the requested driving force in accordance with the state in which the throttle valve opening degree is greatest, based on the intermediate torque, such that the driving force is controlled.

Further, the first control mode according to this disclosure may include a CD mode for consuming stored electric power in the battery by the motor, the second control mode according to this disclosure may include a CS mode in which an amount of charge of the battery is maintained at a predetermined level, or decrease in the amount of charge of the battery is suppressed, and the controller according to this disclosure may be configured to, when the CD mode is selected, forbid use of the wide-open-throttle operation line, and also set the requested driving force in accordance with the state in which the throttle valve opening degree is greatest, based on the compounded torque, such that the driving force is controlled.

Also, the controller according to this disclosure may be configured to determine, when the CD mode is selected, a predetermined condition under which there is a possibility of the exhaust state deteriorating, and when determination is made that there is a possibility of the exhaust state deteriorating, forbid use of the wide-open-throttle operation line, and also set the requested driving force in accordance with the state in which the throttle valve opening degree is greatest, based on the compounded torque, such that the driving force is controlled.

Also, the non-wide-open-throttle operation line according to this disclosure may include a fuel efficiency priority operation line connecting driving points at which the exhaust state is improved as compared with the wide-open-throttle operation line and also fuel efficiency of the engine is improved, and the compounded torque according to this disclosure may include a fuel efficiency priority torque obtained by summing the output torque of the engine determined based on the fuel efficiency priority operation line and the output torque of the motor that is outputtable in accordance with allowable discharge electric power of the battery.

The non-wide-open-throttle operation line according to this disclosure may include an intermediate operation line connecting driving points at which the exhaust state is improved as compared with the wide-open-throttle operation line, the fuel efficiency is improved, and also the output torque of the engine is increased as compared with the fuel efficiency priority operation line, the compounded torque according to this disclosure may include an intermediate torque obtained by summing the output torque of the engine determined based on the intermediate operation line and the output torque of the motor that is outputtable in accordance with allowable discharge electric power of the battery, and the controller according to this disclosure may be configured to, when the CD mode is selected, or when determination is made that there is a possibility of the exhaust state deteriorating, forbid use of the wide-open-throttle operation line, and also set the requested driving force in accordance with the state in which the throttle valve opening degree is greatest, based on the intermediate torque, such that the driving force is controlled.

The hybrid electric vehicle according to this disclosure includes an engine and a motor as driving force sources. A battery is connected to the motor via power source devices, such as an inverter, a converter, and so forth. Thus, the motor is driven by electric power supplied from the battery, and outputs torque. The battery can also be charged with electricity generated by the motor. The engine is operated based on a wide-open-throttle operation line for realizing an operating state in which the greatest torque is output in accordance with a greatest or wide-open throttle valve opening degree, and a non-wide-open-throttle operation line for realizing an operating state in which an exhaust state of the engine is improved in comparison with when operating in accordance with the wide-open-throttle operation line, i.e., an operating state in which a discharge amount of exhaust decreases, and the nature and components of the exhaust improve. The hybrid electric vehicle selectively sets one of the first control mode or the CD mode, and the second control mode or the CS mode, to travel.

In the hybrid electric vehicle configured as described above, when the vehicle travels by selecting the first control mode or the CD mode, and the throttle valve opening degree is greatest, i.e., when a drive requested amount according to operations performed by a driver is greatest, the engine is run and the output torque of the engine is added to generate the driving force, in order to obtain a great driving force to handle the greatest drive request. In this case, in the conventional control, the engine is operated based on the wide-open-throttle operation line as described above, under the concept that the greatest torque of the engine is obtained to handle a great drive request. By adding the greatest torque of the engine to the output torque of the motor in the first control mode or the CD mode, a greater driving force (e.g., the greatest driving force of the hybrid electric vehicle) can be generated, and good power performance of the vehicle can be obtained. However, when the engine is operated in accordance with the wide-open-throttle operation line, while the greatest torque of the engine can be obtained, the exhaust state of the engine deteriorates as compared when the engine is operated in accordance with the non-wide-open-throttle operation line that does not output the greatest torque, for example, as with the fuel efficiency priority operation line. For example, the discharge amount of exhaust increases, and exhaust components such as carbon monoxide (CO) and so forth increase. Further, the fuel efficiency of the engine also deteriorates. In contrast, with the control device for the hybrid electric vehicle according to this disclosure, when the first control mode or the CD mode is selected, operation of the engine based on the wide-open-throttle operation line is forbidden. At the same time, the requested driving force to handle the great driving request with the greatest throttle valve opening degree (i.e., target driving force in driving force control) is set based on the compounded torque in which is combined the engine torque when the engine is operated by the non-wide-open-throttle operation line such as the fuel efficiency priority operation line, the intermediate operation line, or the like, for example, and the motor torque that is outputtable in accordance with the state of the battery at that point in time. Accordingly, even when a great driving force is requested in which the throttle valve opening degree is greatest, use of the wide-open-throttle operation line is circumvented, and deterioration of the exhaust state of the engine is suppressed. Also, the greatest torque of the motor that can be output at that point in time is added to the engine torque based on the non-wide-open-throttle operation line, and accordingly a great drive request can be appropriately handled. That is to say, the power performance of the hybrid electric vehicle can be ensured.

Thus, with the control device for the hybrid electric vehicle according to this disclosure, power performance of the hybrid electric vehicle does not deteriorate, and fuel efficiency of the engine is improved. Moreover, with the control device for the hybrid electric vehicle according to this disclosure, deterioration of exhaust emission of the engine can be suppressed.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

An embodiment of the present disclosure will be described with reference to the drawings. It should be noted that the embodiments shown below are merely examples of cases where the present disclosure is embodied, and do not limit the present disclosure.

Figure 2:
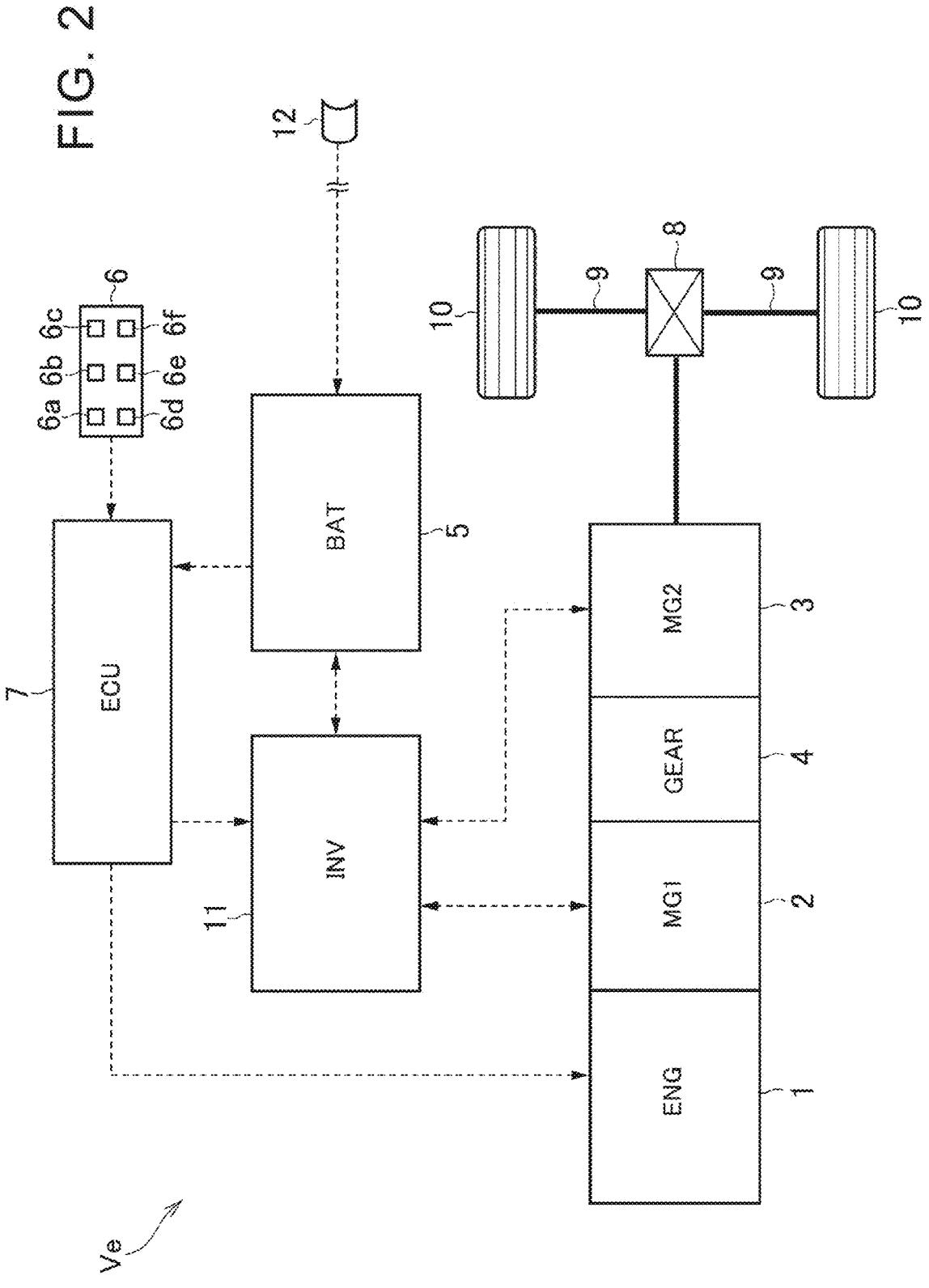
FIG. 2 is a diagram schematically illustrating an exemplary configuration and a control system of a hybrid electric vehicle to be controlled in the present disclosure.

Vehicles to be controlled in the embodiments of the present disclosure are hybrid electric vehicle equipped with at least an engine and a motor as a driving force source. The motor is connected so as to be capable of exchanging electric power with the battery. Power is supplied from a battery to drive the motor, and torque is output by the motor. The battery can also be charged with electricity generated by the motor. Therefore, a so-called motor-generator having both a function as a prime mover and a function as a generator may be used. Alternatively, the motor may include a plurality of motors mainly functioning as a prime mover and a plurality of motors mainly functioning as a generator. In the embodiment described later, an example in which two motors (the first motor 2 and the second motor 3) are mounted is shown. FIG. 2 shows an outline of a configuration of a hybrid electric vehicle (hereinafter, referred to as a vehicle) Ve to be controlled in an embodiment of the present disclosure.

The vehicle Ve shown in FIG. 2 includes an engine (ENG) 1, a first motor (MG) 2, a second motor (MG) 3, a power split mechanism (GEAR) 4, and a battery (BAT) 5. In addition, the vehicle Ve includes a detection unit 6 and controllers (Electronic Control Unit: ECU) 7 to execute various controls.

The engine 1 is, for example, an internal combustion engine such as a gasoline engine or a diesel engine that burns fuel to obtain power. The engine 1 is configured in such a way that the output is adjusted and the operating states, such as starting and stopping, are electrically controlled. In the case of a gasoline engine, an opening degree of a throttle valve, a supply amount or an injection amount of fuel, an injection timing of fuel, an execution and a stop of ignition, an ignition timing, and the like are electrically controlled.

The first motor 2 is connected to the engine 1 and the drive wheels 10, which will be described later, via a power split mechanism 4, which will be described later, so as to be able to transmit power. The first motor 2 is electrically connected to a battery 5, which will be described later, so as to be able to exchange electric power. The first motor 2 also functions as a generator that generates electric power by being driven by receiving torque output from the engine 1. That is, the first motor 2 is a so-called motor generator having a power generation function, and is constituted by, for example, a permanent magnet synchronous motor, an induction motor, or the like.

The second motor 3 is connected via, for example, a differential gear 8 and a drive shaft 9 so as to be capable of transmitting power to the drive wheels 10. The second motor 3 is electrically connected to a battery 5, which will be described later, so that power can be exchanged therebetween. The second motor 3 has at least a function as an electric motor that is driven by being supplied with electric power and outputs torque. The second motor 3 also functions as a generator that generates electric power by being driven by receiving torque from the outside. That is, like the first motor 2, the second motor 3 is a so-called motor generator having a power generation function, and is constituted by, for example, a permanent magnet synchronous motor or an induction motor.

The power split mechanism 4 is connected to each of the engine 1 and the first motor 2 so as to be able to transmit power, and transmits an output torque (engine torque) of the engine 1 and an output torque (motor torque) of the first motor 2 to the drive wheel 10 side. In the example illustrated in FIG. 2, the power split mechanism 4 is disposed coaxially with the first motor 2 and the engine 1 and adjacent to the first motor 2. The power split mechanism 4 is configured using, for example, a differential rotation function of a planetary gear mechanism (not shown).

The battery 5 is, for example, a secondary battery such as a lithium-ion battery or a nickel metal hydride battery. The battery 5 is electrically connected to the first motor 2 and the second motor 3 via an inverter (INV) 11 or the like, so that electric power can be exchanged between the battery 5 and the first motor 2, and can be exchanged between the battery 5 and the second motor 3. Therefore, the battery 5 is charged by the electric power generated by the first motor 2 and stores electricity. Further, the battery 5 supplies electric power to the second motor 3 and generates a driving torque by the second motor 3.

Further, in the embodiment illustrated in FIG. 2, the battery 5 is configured to be able to be charged by electric power supplied from the external power source 12 of the vehicle Ve. Further, as described above, the vehicle Ve generates electric power by the engine 1 and the first motor 2, and is driven by the second motor 3, which will be described later. Therefore, in the embodiment shown in FIG. 2, the vehicle Ve is a so-called split-type "plug-in hybrid electric vehicle (PHEV)" including the power split mechanism 4. However, Ve of vehicles to be controlled in the embodiment is not limited to the split-type PHEV described above. For example, the vehicle Ve may be a "battery electric vehicle with a range extender" that can be charged by the electric power supplied from the external power source 12 as described above. In addition, it may be a normal "hybrid electric vehicle (HEV)" that does not have a charge function from the external power source 12. Alternatively, it may be a HEV or PHEV of a parallel type or a series-type other than the above split-type.

The detection unit 6 is a device or a device for acquiring various types of data and information required for controlling the vehicle Ve, and includes, for example, a power source unit, a microcomputer, a sensor, an input/output interface, and the like. In particular, the detection unit 6 in the embodiment of the present disclosure detects data for controlling the engine 1, the first motor 2, and the second motor 3. For example, the detection unit 6 includes an engine speed sensor 6a that detects the speed of the engine 1, a motor speed sensor 6b that detects the speed of the first motor 2, and a motor speed sensor 6c that detects the speed of the second motor 3. Further, for example, the detection unit 6 includes various sensors and devices such as an SOC sensor 6d that detects the state of charge (SOC) of the battery 5, a battery current sensor 6e that detects the current of the battery 5, and a battery temperature sensor 6f that detects the temperature of the battery 5. The detection unit 6 is electrically connected to a controller 7, which will be described later, and outputs, as detection data, an electric signal corresponding to a detection value or a calculated value of various sensors, devices, and the like as described above to the controller 7.

The controller 7 is, for example, an electronic control unit mainly composed of a microcomputer, and mainly controls operations of the engine 1, the first motor 2, and the second motor 3. Various types of data detected or calculated by the detection unit 6 are input to the controller 7. The controller 7 performs an operation using various input data, data stored in advance, a calculation formula, and the like. The controller 7 outputs the calculation result as a control command signal, and is configured to control the operations of the engine 1, the first motor 2, the second motor 3, and the like as described above.

In particular, the controller 7 according to the embodiment of the present disclosure selectively sets at least a first control mode in which electric power is supplied from the battery 5 to drive the first motor 2 and the second motor 3 (mainly, the second motor 3) and a second control mode in which electric power is not supplied from the battery 5 to the first motor 2 and the second motor 3 to cause the vehicle Ve to travel (battery control). At this time, the controller 7 controls the driving force of the vehicle Ve based on the throttle valve opening degree (that is, the driving request amount by the driver's manipulation) and the requested driving force determined from the vehicle speed (driving force control). Further, the controller 7 controls the operation of the engine 1 based on at least a wide-open-throttle operation line (or a WOT operation line) connecting a driving point at which the engine 1 outputs the maximum torque in a state where the throttle valve opening degree is maximum (that is, the throttle valve opening degree is 100%), and a non-wide-open-throttle operation line connecting a driving point at which the exhaust state of the engine 1 is improved as compared with the wide-open-throttle operation line (engine control). Although only one controller 7 is illustrated in FIG. 2, a plurality of controllers 7 may be provided for each device or device to be controlled or for each control content.

Figure 3:
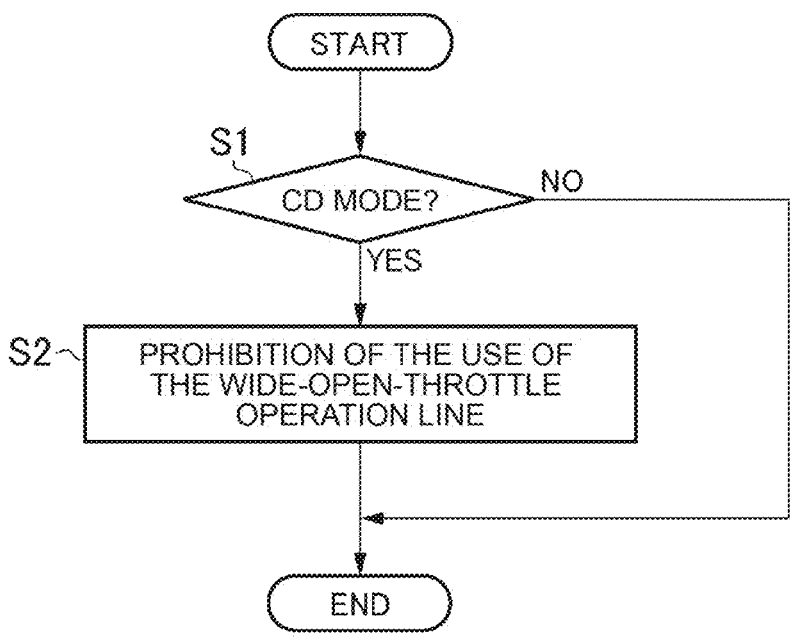
FIG. 3 is a flow chart for explaining an example of control (a basic control example) executed by the control device of hybrid electric vehicle.

In order to appropriately execute the battery control, the driving force control, and the engine control as described above, the controller 7 of the vehicle Ve according to the embodiment of the present disclosure is configured to execute, for example, the control illustrated in the flow chart of FIG. 3.

The control shown in the flow chart of FIG. 3 is executed, for example, when a main switch or a power switch (not shown) of the vehicle Ve is turned ON. First, in S1, it is determined whether or not the control mode for determining the control content of the vehicle Ve and the battery 5 is set to Charge Depleting (CD) mode or the first control mode. CD mode is a control mode in which the electric power stored in the battery 5 is consumed by the motors 2 and 3, and is included in the "first control mode" in the embodiment. Therefore, in CD mode, electric power is supplied from the battery 5 to drive the first motor 2 or the second motor 3.

In the battery control according to the embodiment of the present disclosure, one of CD mode (or the first control mode) and charge sustaining (CS) mode (or the second control mode) is selected and set in accordance with, for example, state of charge (SOC) of the battery 5. CS mode is a control mode in which the amount of charge of the battery 5 is maintained at a predetermined level or a decrease in the amount of charge of the battery 5 is suppressed, and is included in the "second control mode" in the embodiment of the present disclosure. Therefore, in CS mode, no electric power is supplied from the battery 5 to the first motor 2 and the second motor 3.

CD mode and CS mode are switched according to, for example, SOC of the battery 5. Basically, PHEV illustrated in FIG. 2 travels by the second motor 3 using the stored electric power of the battery 5 charged by the external power source 12. Therefore, in a normal state in which SOC of the battery 5 is adequate, CD mode is selected, power is supplied from the battery 5, and the second motor 3 is driven. Then, when SOC of the battery 5 drops to a predetermined level, the control is performed so as to shift to CS mode and maintain the amount of charge of the battery 5 at the predetermined level.

When the control mode of the vehicles Ve and the battery 5 is not CD mode (first control mode), that is, when it is determined that the control mode is "No" in this S1 because the control mode is set to CS mode (second control mode), the subsequent control is not executed. If "No" is determined in S1, the routine shown in the flow chart of FIG. 3 is temporarily ended.

On the other hand, when the control mode of the vehicles Ve and the battery 5 is set to CD mode (the first control mode), and thus "Yes" is determined in S1, the process proceeds to S2.

Figure 4:
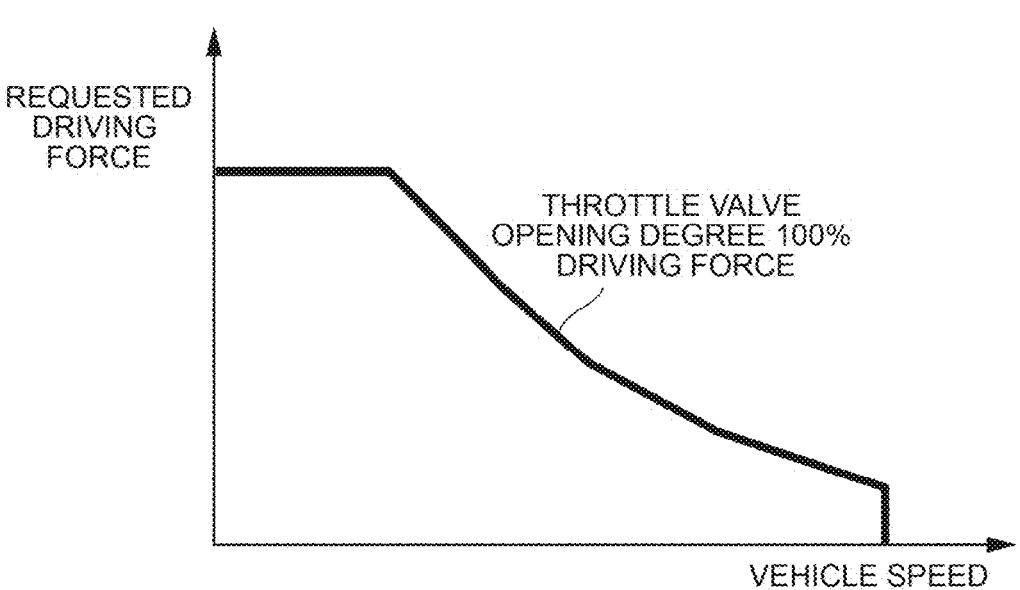
FIG. 4 is a diagram showing an image of a requested driving force map used for driving force control of hybrid electric vehicle.

In S2, the use of the wide-open-throttle operation line (or WOT operation line) is prohibited. At the same time, as shown in FIG. 4, in the driving force control according to the embodiment of the present disclosure, the requested driving force corresponding to the state in which the throttle valve opening degree is the maximum (100%) is set based on the compounded torque (or the fuel efficiency priority torque) obtained by summing the engine torque determined based on the non-wide-open-throttle operation line (or the fuel efficiency priority operation line) and the motor torque that can be output in accordance with the allowable discharge electric power (or the dischargeable electric power) of the battery 5. Further, in the engine control according to the embodiment of the present disclosure, as illustrated in FIG.

1, the operation of the engine 1 is controlled based on the wide-open-throttle operation line and the fuel efficiency priority operation line.

The wide-open-throttle operation line is an operation line connecting a driving point at which the engine 1 outputs the maximum torque in a state in which the driving request by the operation of the driver is maximum, that is, in a state in which the throttle valve opening degree is maximum (100%). The driving point of the engine 1 is, for example, a control target value of the engine 1 determined from the engine torque and the engine speed in the engine control. By controlling the engine 1 based on the wide-open-throttle operation line, the engine 1 is in an operating state in which the maximum torque is output. Accordingly, the vehicle Ve is ready to generate the maximum driving force corresponding to the maximum or throttle valve opening degree.

On the other hand, the fuel efficiency priority operation line is an operation line connecting a driving point at which the exhaust state of the engine 1 is improved, the fuel efficiency of the engine 1 is improved, or the fuel efficiency of the engine 1 is optimized, as compared with the wide-open-throttle operation line. That is, the fuel efficiency priority operation line is an operation line connecting a driving point at which an exhaust state such as an exhaust amount and an exhaust component of the engine 1 is improved as compared with the wide-open-throttle operation line, and is included in the non-wide-open-throttle operation line in the embodiment of the present disclosure. By controlling the engine 1 based on the non-wide-open-throttle operation line, it is possible to reduce the discharge amount of exhaust of the engine 1 and to reduce exhaust components such as CO as compared with the case where the engine 1 is controlled based on the wide-open-throttle operation line. Further, by controlling the engine 1 based on the fuel efficiency priority operation line, it is possible to reduce the discharge amount of exhaust of the engine 1 as compared with the case where the engine 1 is controlled based on the wide-open-throttle operation line, and to reduce exhaust components such as CO. Further, the fuel efficiency of the engine 1 can be improved.

As described above, when CD mode is set in PHEV as illustrated in FIG. 2, when a large driving force is required to maximize the throttle valve opening degree, the output of the engine 1 is added together with the output of the second motor 3 in CD mode to generate a large driving force corresponding to the requested driving force. In such a case, in the conventional control, in order to prioritize the power over the fuel efficiency of the engine 1, the engine 1 is controlled in the maximum output state by selecting the wide-open-throttle operation line as described above. Since the exhaust gas temperature is increased in the maximum-output state of the engine 1, an increase in the fuel-injection amount (so-called OTP increase or OT increase) may be performed in order to lower the exhaust gas temperature and protect the catalyst. Therefore, when the engine 1 is controlled based on the wide-open-throttle operation line, the fuel consumption and the exhaust emission (the characteristics and the discharge amount of the exhaust gas) of the engine 1 deteriorate as compared with the case where the engine 1 is controlled based on the non-wide-open-throttle operation line or the fuel efficiency priority operation line. When the fuel efficiency priority operation line or the non-wide-open-throttle operation line is selected in response to a large driving demand such that the throttle valve opening degree is maximized, the obtained driving force is insufficient, and the power performance of the vehicle Ve is deteriorated.

Therefore, in the control device of hybrid electric vehicle Ve according to the embodiment of the present disclosure, as illustrated in the flow chart of FIG. 3 and FIG. 4, when the control modes of the vehicles Ve and the battery 5 are set to CD mode (first control mode), the operation of the engine 1 based on the wide-open-throttle operation line is prohibited. At the same time, the requested driving force to handle the great driving request with the maximum throttle valve opening degree is set based on the fuel efficiency priority torque (or the compounded torque) that combines the engine torque in the case where the engine 1 is operated by the fuel efficiency priority operation line (or the non-wide-open-throttle operation line) and the motor torque that can be output in accordance with the state of the battery 5 at that time. By prohibiting the operation of the engine 1 based on the wide-open-throttle operation line, deterioration of the exhaust state of the engine 1 is suppressed. At the same time, in addition to the engine torque, the requested driving force is set based on the fuel efficiency priority torque (compounded torque) that combines the maximum motor torque that can be output at that time, so that an appropriate driving force to handle the driving request can be obtained.

As described above, when S2 prohibits the use of the wide-open-throttle operation line and sets the requested driving force based on the fuel efficiency priority torque (compounded torque), the routine shown in the flow chart of FIG. 3 is terminated once.

Figure 5:
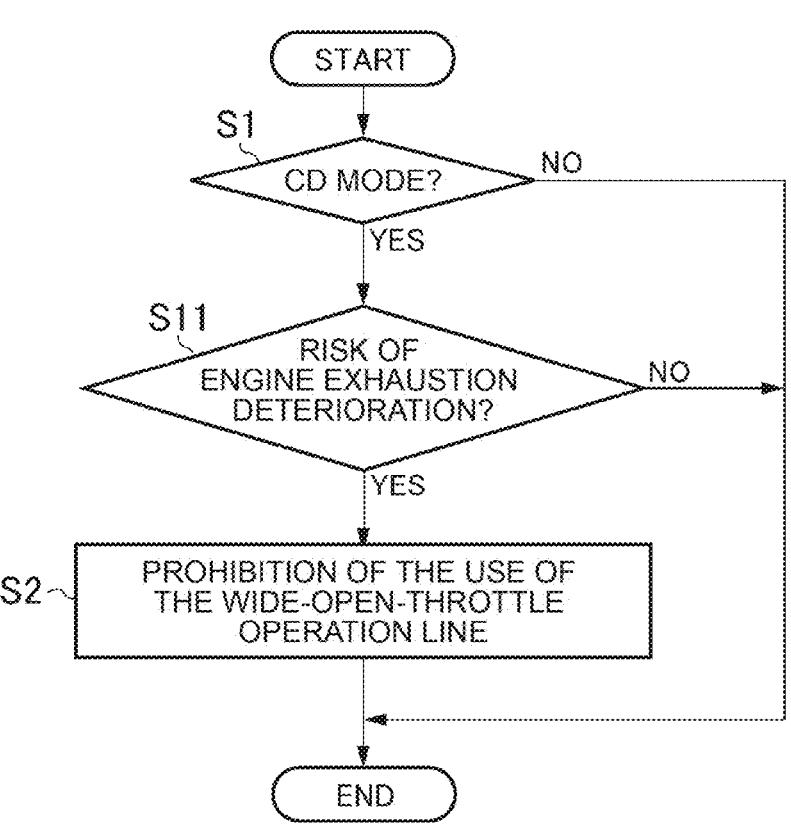
FIG. 5 is a flow chart for describing another example of control executed by the control device of hybrid electric vehicle of the present disclosure (a control example in which a control for determining an exhaust-state of an engine is added)

FIG. 5 is a flow chart illustrating another exemplary control executed by the control device of hybrid electric vehicle according to the embodiment. In the control illustrated in the flow chart of FIG. 5, the control of S11 is added to the control illustrated in the flow chart of FIG. 4.

In the flow chart of FIG. 5, when the control mode of the vehicle Ve and the battery 5 is set to CD mode (first control mode) and thus "Yes" is determined in S1, S11 determines whether or not a predetermined condition that may deteriorate the exhaust condition of the engine 1 is satisfied.

As a predetermined condition in which the exhaust state of the engine 1 may deteriorate, for example, the following conditions may be used.

(1) The intake air temperature of the engine 1 is equal to or higher than a predetermined temperature, (2) The exhaust temperature of the engine 1 is equal to or higher than a predetermined temperature, (3) The temperature of the coolant of the engine 1 is equal to or higher than a predetermined temperature, (4) The estimated temperature of the catalyst (not shown) is greater than or equal to a predetermined temperature, (5) The elevation of the present position of the vehicle Ve shall be equal to or higher than a predetermined altitude, (6) The use of fuel with fuel properties (which may deteriorate exhaust conditions), and the like. When at least one of these predetermined conditions is satisfied, it is determined that there is a possibility that the exhaust state of the engine 1 is deteriorated.

When it is determined in this S11 that "No" is satisfied because it is determined that none of the above-described predetermined conditions are satisfied and there is no possibility that the exhausting condition of the engine 1 deteriorates, the subsequent control is not executed. If "No" is determined in S11, the routine shown in the flow chart of FIG. 5 is temporarily ended.

On the other hand, when it is determined that at least one of the above-described predetermined conditions is satisfied and it is determined that there is a possibility that the exhausting condition of the engine 1 is deteriorated, and thus "Yes" is determined in S11, the process proceeds to S2, and the same control as in the past is executed. That is, a process of prohibiting the use of the wide-open-throttle operation line and setting the requested driving force based on the fuel efficiency priority torque (compounded torque) is executed.

Figure 6:
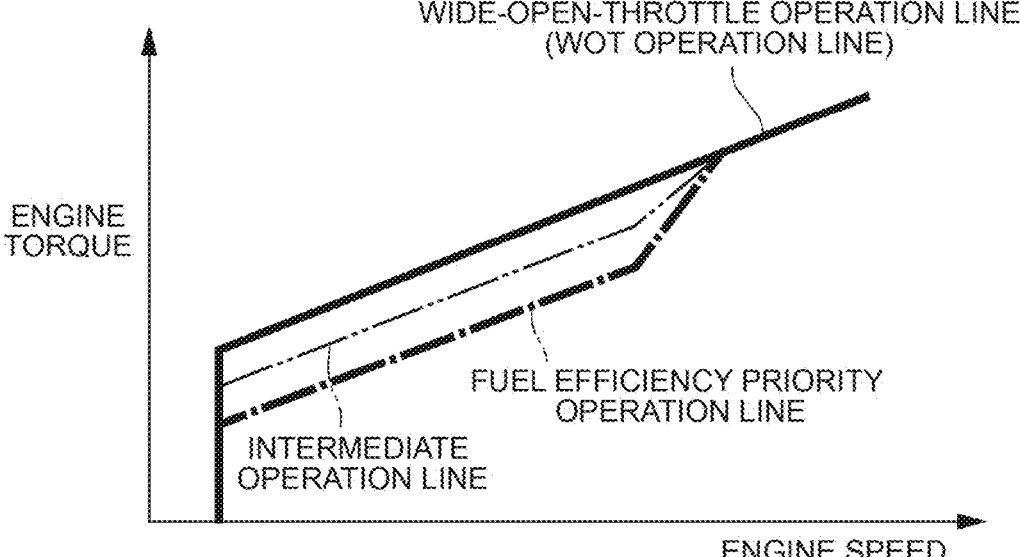
FIG. 6 is a diagram illustrating images of a wide-open-throttle operation line, a fuel efficiency priority operation line, and an intermediate operation line used for engine-control and drive-force control of hybrid electric vehicle of the present disclosure.

Note that the control device of hybrid electric vehicle Ve according to the embodiment of the present disclosure may be configured, for example, as shown in FIG. 6, to execute the engine control by setting an intermediate operation line in addition to the above-described wide-open-throttle operation line and fuel efficiency priority operation line. The intermediate operation line is an operation line connecting a driving point at which the exhaust state of the engine 1 is improved, the fuel efficiency of the engine 1 is improved, and the engine torque is increased as compared with the above-described fuel efficiency priority operation line, as compared with the above-described wide-open-throttle operation line. That is, the intermediate operation line is an operation line connecting at least a driving point at which the exhaust state such as the exhaust amount and the exhaust component of the engine 1 is improved as compared with the wide-open-throttle operation line, and is included in the non-wide-open-throttle operation line in the embodiment of the present disclosure.

In the control device of hybrid electric vehicle Ve according to the embodiment of the present disclosure, the use of the wide-open-throttle operation line is prohibited, for example, by S2 in the flow chart of FIG. 3 or FIG. 5. Further, in S2, a process of setting the requested driving force based on the intermediate torque (compounded torque) is executed. The intermediate torque is a compounded torque obtained by summing the engine torque determined based on the intermediate operation line and the motor torque that can be output in accordance with the allowable discharge electric power of the battery 5.

Figure 1:
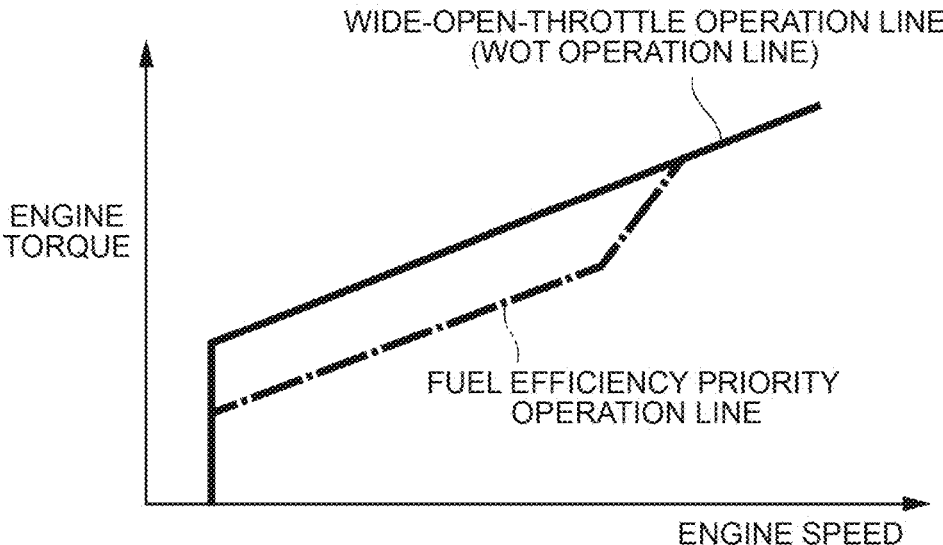
FIG. 1 is a diagram showing images of a wide-open-throttle operation line (WOT operation line) and a fuel efficiency priority operation line used for conventional engine control.

In the control device of hybrid electric vehicle Ve according to the embodiment of the present disclosure, as illustrated in FIG. 6, three operation lines, a wide-open-throttle operation line, a fuel efficiency priority operation line, and an intermediate operation line, are set. In the control device of hybrid electric vehicle Ve, the engine control may be executed by appropriately selecting three torques (the maximum torque, the fuel efficiency priority torque, and the intermediate torque) determined based on the three operation lines. Alternatively, in the control device of hybrid electric vehicle Ve, the intermediate operation line is set instead of the fuel efficiency priority operation lines of the wide-open-throttle operation line and the fuel efficiency priority operation line illustrated in FIG. 1. In the control device of hybrid electric vehicle Ve, the engine control may be executed by appropriately selecting the torque (the maximum torque and the intermediate torque) determined based on the two operation lines of the wide-open-throttle operation line and the intermediate operation line.

As described above, in the control device of hybrid electric vehicle according to the embodiment of the present disclosure, when the first control mode or the CD mode is selected, the operation of the engine 1 based on the wide-open-throttle operation line is prohibited. At the same time, the requested driving force (that is, the target driving force in the driving force control) to handle the large driving request having the maximum throttle valve opening degree is set based on the compounded torque (that is, the fuel efficiency priority torque or the intermediate torque) that combines the engine torque in the case where the engine 1 is operated by the non-wide-open-throttle operation line such as the fuel efficiency priority operation line or the intermediate operation line and the motor torque that can be output in accordance with the state of the battery at that time. Therefore, even in a case where a large driving force that maximizes the throttle valve opening degree is required, the use of the wide-open-throttle operation line is avoided, and deterioration of the exhaust state of the engine 1 is suppressed. Also, the greatest torque of the motor that can be output at that point in time is added to the engine torque based on the non-wide-open-throttle operation line, and accordingly a great drive request can be appropriately handled. That is, the power performance of the vehicle Ve can be ensured.

Therefore, according to hybrid electric vehicle Ve control device of the embodiment of the present disclosure, it is possible to improve the fuel efficiency of the engine 1 without deteriorating the power performance of the vehicle Ve. In addition, according to hybrid electric vehicle Ve control device of the embodiment of the present disclosure, it is possible to suppress the exhaust emission of the engine 1 from deteriorating.

What is claimed is:

1. A control device for a hybrid electric vehicle including an engine and a motor that are installed as driving force sources, and a battery for exchanging electric power with the motor, in which traveling is performable by selectively setting at least a first control mode for driving the motor by supplying electric power from the battery, and a second control mode for not supplying electric power to the motor from the battery, and in which driving force is controlled based on a requested driving force that is set in accordance with a vehicle speed and a throttle valve opening degree, the control device comprising a controller for controlling the hybrid electric vehicle, wherein:

the controller controls the engine based on at least a wide-open-throttle operation line connecting driving points at which the engine outputs greatest torque in a state in which the throttle valve opening degree is greatest, and a non-wide-open-throttle operation line connecting driving points at which an exhaust state of the engine improves in comparison with the wide-open-throttle operation line;

the controller selects one of the first control mode and the second control mode to cause the hybrid electric vehicle to travel in;

when the first control mode is selected, or when determination is made that there is a possibility of the exhaust state deteriorating, the controller forbids use of the wide-open-throttle operation line, and also sets the requested driving force in accordance with the state in which the throttle valve opening degree is greatest, based on a compounded torque obtained by summing output torque of the engine that is determined based on the non-wide-open-throttle operation line and output torque of the motor that is outputtable in accordance with allowable discharge electric power of the battery, such that the driving force is controlled;

the non-wide-open-throttle operation line includes a fuel efficiency priority operation line connecting driving points at which the exhaust state is improved as compared with the wide-open-throttle operation line and also fuel efficiency of the engine is improved;

the compounded torque includes a fuel efficiency priority torque obtained by summing the output torque of the engine determined based on the fuel efficiency priority operation line and the output torque of the motor that is outputtable in accordance with allowable discharge electric power of the battery;

the non-wide-open-throttle operation line includes an intermediate operation line connecting driving points at which the exhaust state is improved as compared with the wide-open-throttle operation line, the fuel efficiency is improved, and also the output torque of the engine is increased as compared with the fuel efficiency priority operation line;

the compounded torque includes an intermediate torque obtained by summing the output torque of the engine determined based on the intermediate operation line and the output torque of the motor that is outputtable in accordance with allowable discharge electric power of the battery; and the controller also sets the requested driving force in accordance with the state in which the throttle valve opening degree is greatest, based on the intermediate torque, such that the driving force is controlled.

2. The control device according to claim 1, wherein:

the first control mode includes a charge depleting mode for consuming stored electric power in the battery by the motor; and the second control mode includes a charge sustaining mode that maintains an amount of charge in the battery at a predetermined level.

3. A control device for a hybrid electric vehicle including an engine and a motor that are installed as driving force sources, and a battery for exchanging electric power with the motor, in which traveling is performable by selectively setting at least a first control mode for driving the motor by supplying electric power from the battery, and a second control mode for not supplying electric power to the motor from the battery, and in which driving force is controlled based on a requested driving force that is set in accordance with a vehicle speed and a throttle valve opening degree, the control device comprising a controller for controlling the hybrid electric vehicle, wherein:

the controller controls the engine based on at least a wide-open-throttle operation line connecting driving points at which the engine outputs greatest torque in a state in which the throttle valve opening degree is greatest, and a non-wide-open-throttle operation line connecting driving points at which an exhaust state of the engine improves in comparison with the wide-open-throttle operation line;

the controller selects one of the first control mode and the second control mode to cause the hybrid electric vehicle to travel in;

when the first control mode is selected, forbids use of the wide-open-throttle operation line, and also sets the requested driving force in accordance with the state in which the throttle valve opening degree is greatest, based on a compounded torque obtained by summing output torque of the engine that is determined based on the non-wide-open-throttle operation line and output torque of the motor that is outputtable in accordance with allowable discharge electric power of the battery, such that the driving force is controlled;

the first control mode includes a charge depleting mode for consuming stored electric power in the battery by the motor;

the second control mode includes a charge sustaining mode that maintains an amount of charge in the battery at a predetermined level;

the controller determines, when the charge depleting mode is selected, a predetermined condition under which there is a possibility of the exhaust state deteriorating; and the controller, when determination is made that there is a possibility of the exhaust state deteriorating, forbids use of the wide-open-throttle operation line, and also sets the requested driving force in accordance with the state in which the throttle valve opening degree is greatest, based on the compounded torque, such that the driving force is controlled.

4. The control device according to claim 3, wherein:

the non-wide-open-throttle operation line includes a fuel efficiency priority operation line connecting driving points at which the exhaust state is improved as compared with the wide-open-throttle operation line and also fuel efficiency of the engine is improved; and the compounded torque includes a fuel efficiency priority torque obtained by summing the output torque of the engine determined based on the fuel efficiency priority operation line and the output torque of the motor that is outputtable in accordance with allowable discharge electric power of the battery.

5. The control device according to claim 4 wherein:

the non-wide-open-throttle operation line includes an intermediate operation line connecting driving points at which the exhaust state is improved as compared with the wide-open-throttle operation line, the fuel efficiency is improved, and also the output torque of the engine is increased as compared with the fuel efficiency priority operation line;

the compounded torque includes an intermediate torque obtained by summing the output torque of the engine determined based on the intermediate operation line and the output torque of the motor that is outputtable in accordance with allowable discharge electric power of the battery; and when the determination is made that there is the possibility of the exhaust state deteriorating, the controller forbids use of the wide-open-throttle operation line, and also sets the requested driving force in accordance with the state in which the throttle valve opening degree is greatest, based on the intermediate torque, such that the driving force is controlled.

* * * * *